US010461535B2

(12) United States Patent
Tokunaga et al.

(10) Patent No.: US 10,461,535 B2
(45) Date of Patent: Oct. 29, 2019

(54) POWER MANAGEMENT SYSTEM, POWER MANAGEMENT METHOD, AND COMPUTER PROGRAM

(71) Applicant: PANASONIC INTELLECTUAL PROPERTY MANAGEMENT CO., LTD., Osaka (JP)

(72) Inventors: Yoshihiko Tokunaga, Hyogo (JP); Seiichi Miyazaki, Osaka (JP); Naohiro Fukuda, Chiba (JP); Hiroyuki Kuriyama, Kanagawa (JP); Norimasa Ota, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 780 days.

(21) Appl. No.: 15/025,863

(22) PCT Filed: Sep. 18, 2014

(86) PCT No.: PCT/JP2014/004797
§ 371 (c)(1),
(2) Date: Mar. 29, 2016

(87) PCT Pub. No.: WO2015/045336
PCT Pub. Date: Apr. 2, 2015

(65) Prior Publication Data
US 2016/0241034 A1 Aug. 18, 2016

(30) Foreign Application Priority Data

Sep. 30, 2013 (JP) .................................. 2013-205075

(51) Int. Cl.
*H02J 3/00* (2006.01)
*G06Q 50/06* (2012.01)
(Continued)

(52) U.S. Cl.
CPC .............. *H02J 3/008* (2013.01); *G06Q 10/06* (2013.01); *G06Q 40/04* (2013.01); *G06Q 50/06* (2013.01);
(Continued)

(58) Field of Classification Search
CPC ........ H02J 3/008; H02J 3/32; H02J 2003/003; Y02P 90/90; Y04S 10/58; Y04S 50/10
See application file for complete search history.

(56) References Cited

U.S. PATENT DOCUMENTS

2002/0143438 A1  10/2002  Akiyama et al.
2012/0191262 A1*  7/2012  Marcus .............. G06Q 30/0202
                                                        700/286
(Continued)

FOREIGN PATENT DOCUMENTS

EP        2475068 A1    7/2012
JP    2002-152976 A    5/2002
(Continued)

OTHER PUBLICATIONS

Extended European Search Report issued in European Application No. 14849946.0 dated Oct. 5, 2016.
(Continued)

*Primary Examiner* — Robert E Fennema
*Assistant Examiner* — Marzia T Monty
(74) *Attorney, Agent, or Firm* — McDermott Will & Emery LLP

(57) ABSTRACT

A power management system includes a first administrator, a second administrator, a first estimator, a second estimator and a determiner. The first administrator manages a residual capacity of a power storage apparatus. The second administrator manages interruption information regarding a power grid. The first estimator estimates, as first power information, an amount of power that is consumed by an electric
(Continued)

load during an interruption period. The second estimator estimates an estimation residual capacity that is the residual capacity at an end point of the interruption period, based on the first power information. The determiner determines that a condition for participating in a power trade market is met, when the estimation residual capacity exceeds a reference value.

13 Claims, 3 Drawing Sheets

(51) Int. Cl.
G06Q 10/06 (2012.01)
G06Q 40/04 (2012.01)
H02J 3/32 (2006.01)

(52) U.S. Cl.
CPC .......... *H02J 3/32* (2013.01); *H02J 2003/003* (2013.01); *Y02P 90/90* (2015.11); *Y04S 10/58* (2013.01); *Y04S 10/60* (2013.01); *Y04S 50/10* (2013.01)

(56) References Cited

U.S. PATENT DOCUMENTS

| | | | |
|---|---|---|---|
| 2012/0221491 A1* | 8/2012 | Koshin | G06Q 10/06 705/412 |
| 2013/0015708 A1 | 1/2013 | Ukita et al. | |
| 2014/0042811 A1* | 2/2014 | Myamoto | H02J 3/383 307/31 |

FOREIGN PATENT DOCUMENTS

| | | |
|---|---|---|
| JP | 2004-129499 A | 4/2004 |
| JP | 2005-086953 A | 3/2005 |
| JP | 2005-086984 A | 3/2005 |
| JP | 2011-101532 A | 5/2011 |
| JP | 2012-228043 A | 11/2012 |
| JP | 2013-025359 A | 2/2013 |
| JP | 2013-031271 A | 2/2013 |

OTHER PUBLICATIONS

International Search Report and Written Opinion issued in corresponding International Patent Application No. PCT/JP2014/004797 dated Dec. 9, 2014; with partial English translation.

* cited by examiner

| UNIT PRICE (yen) | 7.00 or less | 7.00 -7.50 | 7.50 -8.10 | 8.10 -8.50 | 8.50 -9.00 | 9.00 or more |
|---|---|---|---|---|---|---|
| AMOUNT OF POWER (1000kWh) | 28 | 22 | 13 | 7 | 5 | 0 |

| UNIT PRICE (yen) | 7.00 or less | 7.00 -7.20 | 7.20 -9.00 | 9.00 or more |
|---|---|---|---|---|
| AMOUNT OF POWER (1000kWh) | 0 | 7 | 12 | 25 |

200
POWER MANAGEMENT SYSTEM, POWER MANAGEMENT METHOD, AND COMPUTER PROGRAM

RELATED APPLICATIONS

This application is the U.S. National Phase under 35 U.S.C. § 371 of International Patent Application No. PCT/JP2014/004797, filed on Sep. 18, 2014, which in turn claims the benefit of Japanese Application No. 2013-205075, filed on Sep. 30, 2013, the disclosures of which Applications are incorporated by reference herein.

TECHNICAL FIELD

The invention relates generally to power management systems, power management methods and computer programs and, more particularly, to a power management system configured to manage electric power that is output from a power storage apparatus installed within a consumer's building or around the building, a power management method for the power management system, and a computer program for realizing the power management system.

BACKGROUND ART

There has been recently provided a power storage apparatus to be used in a consumer's facility. This type of power storage apparatus is used to be charged while a power grid is in a normal state and supply power to electric loads while the power grid is in a service interruption state.

For example, JP 2012-228043 A (hereinafter, referred to as "Document 1") discloses a technique of: acquiring interruption schedule period information that indicates an interruption schedule period, determined by planned outage; and performing an autonomous operation of a storage battery (apparatus) during the interruption schedule period indicated by the interruption schedule period information. In other words, the technique in Document 1 determines a load(s) to which power is supplied and a timing at which the power is supplied, during the interruption schedule period.

In addition, JP 2013-31271 A (hereinafter, referred to as "Document 2") discloses a configuration that power of a storage battery is supplied to a power consumption device, and further a technique of supplying power from the storage battery to the power consumption device during planned outage.

Incidentally, in a consumer's facility, a cost at introduction of a storage battery (power storage apparatus) capable of supplying power to an electric load is high. The high cost is a factor in a hindrance to spreading a power storage apparatus. Supplying power of a storage battery to an electric load during a service interruption, such as the techniques in Documents 1 and 2, leads to improve convenience, but it is impossible to provide a sufficient motivation for promoting spread of a storage battery.

DISCLOSURE OF THE INVENTION

It is an object of the present invention to provide a power management system, which can provide a motivation for promoting use of a power storage apparatus, and further provide a power management method for the power management system, and a computer program for realizing the power management system.

A power management system according to an aspect of the present invention includes: a first administrator configured to manage a residual capacity of a power storage apparatus; a second administrator configured to manage interruption information that includes an interruption period during which a power grid is in a service interruption state; a first estimator configured to estimate, as first power information, an amount of power that is consumed by an electric load during the interruption period; a second estimator configured to estimate, at a start point of the interruption period or before start of the interruption period, an estimation residual capacity based on the first power information, the estimation residual capacity being the residual capacity at an end point of the interruption period; and a determiner configured to determine that a condition for participating in a power trade market is met, when the estimation residual capacity exceeds a reference value, and to set an amount of power by which the estimation residual capacity exceeds the reference value, as an upper limit of a power selling amount in the power trade market.

A power management method according to an aspect of the present invention includes: managing, with a first administrator, a residual capacity of a power storage apparatus; managing, with a second administrator, interruption information that includes an interruption period during which a power grid is in a service interruption state; estimating, with a first estimator, as first power information, an amount of power that is consumed by an electric load during the interruption period; estimating, with a second estimator, at a start point of the interruption period or before start of the interruption period, an estimation residual capacity based on the first power information, the estimation residual capacity being the residual capacity at an end point of the interruption period; determining, with a determiner, that a condition for participating in a power trade market is met, when the estimation residual capacity exceeds a reference value; and setting, with the determiner, an amount of power by which the estimation residual capacity exceeds the reference value, as an upper limit of a power selling amount in the power trade market.

A computer program according to an aspect of the present invention is to cause a computer to function as the above-mentioned power management system. Also, the aspect of the present invention is not limited to the computer program, and may be a computer-readable storage medium that stores the computer program.

According to the configuration of the aspects of the present invention, power is supplied from the power storage apparatus to the electric load during the interruption period, and for this reason, even while the power grid is in the service interruption state, it is possible to use the electric load and secure the convenience. In addition, since the second estimator estimates the estimation residual capacity that is the residual capacity of the power storage apparatus at the end point of the interruption period and the determiner determines that the condition for participating in the power trade market is met, when the estimation residual capacity exceeds the reference value, it is possible to participate in the power trade market, using power stored in the power storage apparatus, as an object for a power trade. Therefore, a possibility to obtain a price is generated without impairing the convenience of the power storage apparatus during the interruption period with the use of the power storage apparatus, and therefore, a motivation for promoting use of the power storage apparatus can be provided.

BRIEF DESCRIPTION OF THE DRAWINGS

Preferred embodiments of the invention will now be described in further details. Other features and advantages of the invention will become better understood with regard to the following detailed description and accompanying drawings where.

DESCRIPTION OF EMBODIMENTS (Outline)

Figure 1:
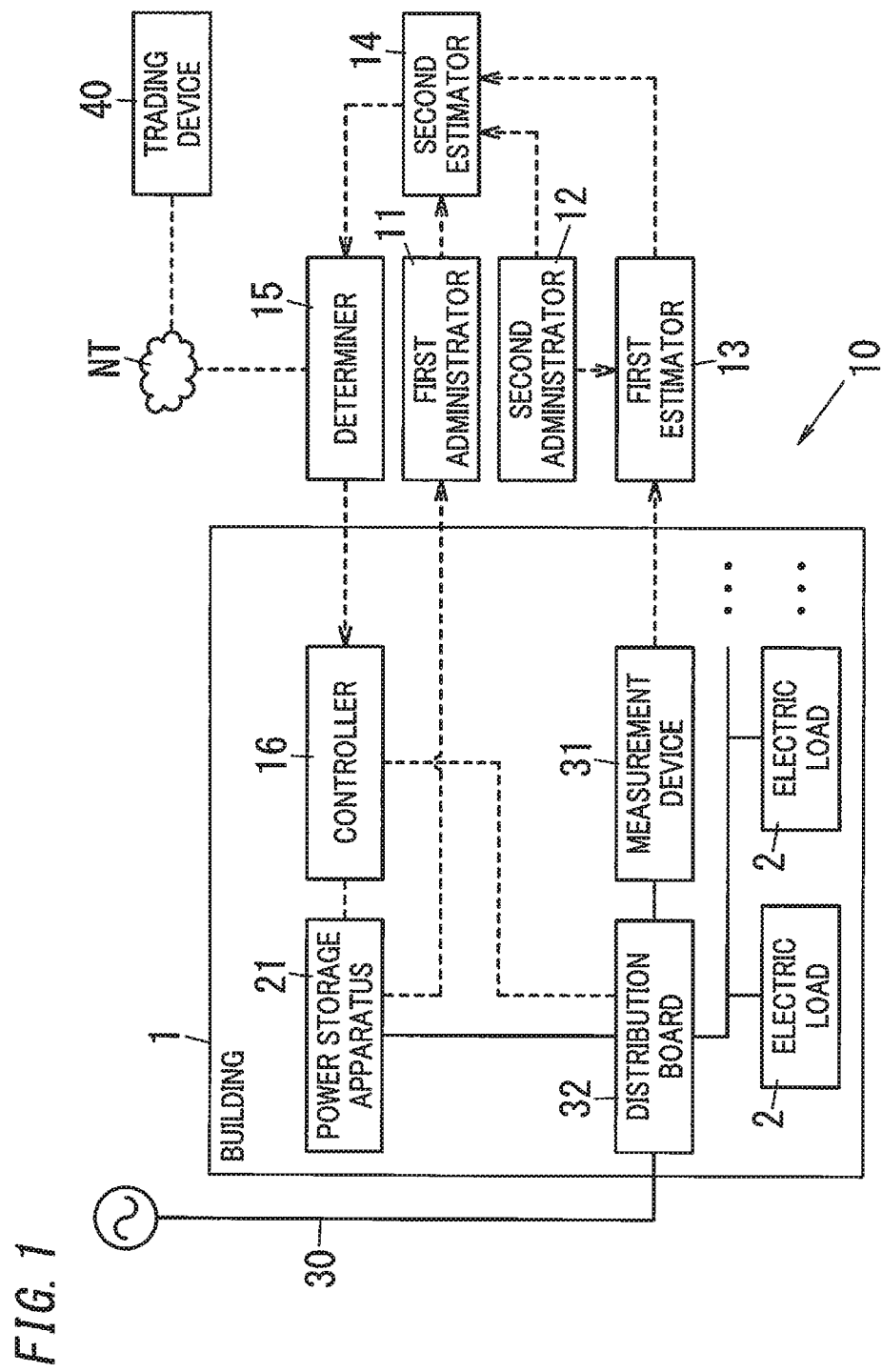
FIG. 1 is a block diagram illustrating Embodiment 1.

As shown in FIG. 1, a power management system 10 described below includes a first administrator 11, a second administrator 12, a first estimator 13, a second estimator 14 and a determiner 15. The first administrator 11 is configured to manage a residual capacity of a power storage apparatus 21. The second administrator 12 is configured to manage interruption information that includes an interruption period during which a power grid 30 is in a service interruption state. The first estimator 13 is configured to estimate, as first power information, an amount of power that is consumed by an electric load(s) 2 during the interruption period. The second estimator 14 is configured to estimate, at a start point of the interruption period or before start of the interruption period, an estimation residual capacity based on the first power information, the estimation residual capacity being the residual capacity at an end point of the interruption period. The determiner 15 is configured to determine that a condition for participating in a power trade market is met, when the estimation residual capacity exceeds a reference value, and to set an amount of power by which the estimation residual capacity exceeds the reference value, as an upper limit of a power selling amount in the power trade market. Preferably, the determiner 15 is also configured to determine that it is impossible to participate in the power trade market, when the estimation residual capacity is equal to or less than the reference value.

Figure 4:
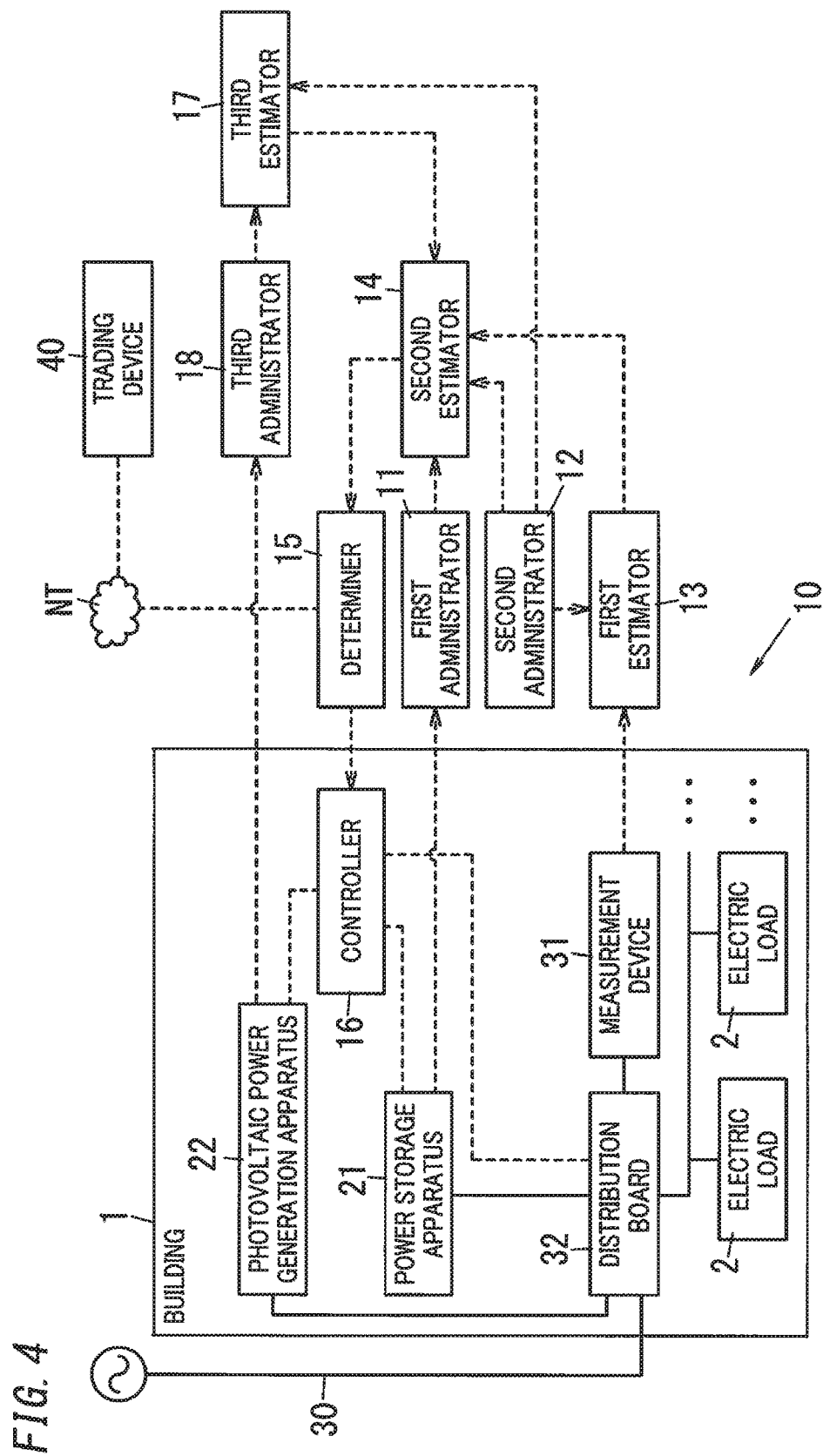
FIG. 4 is a block diagram illustrating Embodiment 2.

As shown in FIG. 4, the power management system 10 may further include a third estimator 17. The third estimator 17 is configured to estimate, as second power information, an amount of power to be generated during the interruption period by a power generation apparatus (photovoltaic power generation apparatus 22) that generates power using natural energy and supplies, to the electric load 2, generated power prior to power output from the power storage apparatus 21. The second estimator 14 may be configured to estimate, at the start point of the interruption period or before the start of the interruption period, the estimation residual capacity based on the second power information in addition to the first power information.

The power management system 10 preferably further include a controller 16. The controller 16 is configured to select any one of: a first state of supplying power from the power storage apparatus 21 to the electric load 2; and a second state of supplying power from the power storage apparatus 21 to the power grid 30. The determiner 15 is configured to instruct the controller 16 to select the second state, when a contract for a power trade is made.

A power management method described below includes: managing, with a first administrator 11, a residual capacity of a power storage apparatus 21; managing, with a second administrator 12, interruption information that includes an interruption period during which a power grid 30 is in a service interruption state; estimating, with a first estimator 13, as first power information, an amount of power that is consumed by an electric load 2 during the interruption period; estimating, with a second estimator 14, at a start point of the interruption period or before start of the interruption period, an estimation residual capacity based on the first power information, the estimation residual capacity being the residual capacity at an end point of the interruption period; determining, with a determiner 15, that a condition for participating in a power trade market is met, when the estimation residual capacity exceeds a reference value; and setting, with the determiner 15, an amount of power by which the estimation residual capacity exceeds the reference value, as an upper limit of a power selling amount in the power trade market.

A computer program described below is to cause a computer to function as the power management system 10 described above. The computer program may be provided through a telecommunication network such as the Internet, or a computer-readable storage medium. Also, a trading device 40 described below is constituted by, for example, a web-server operated by an electric utility or a cloud computing system.

Accordingly, the power management system 10 includes, as a main hardware element, a processor that operates according to a program. A configuration of this type of processor is not limited, and may be e.g., a microcontroller formed integrally with a memory, a configuration separately from a memory, or a configuration where two or more processors are cooperated.

In embodiments described below, the power storage apparatus 21 is installed in a consumer's building 1 (disposed within the building 1 or around the building 1), as shown in FIG. 1. The power storage apparatus 21 includes a storage battery, and a power converter for performing charging and discharging of the storage battery. The photovoltaic power generation apparatus 22 with a solar cell may be installed within the consumer's building 1 or around it, as shown in FIG. 4. In the case where only the power storage apparatus 21 is installed, the storage battery in the power storage apparatus 21 is charged with power received from the power grid 30. In the case where the photovoltaic power generation apparatus 22 is installed in addition to the power storage apparatus 21, the storage battery in the power storage apparatus 21 is charged with not only power received from the power grid 30 but also power generated by the photovoltaic power generation apparatus 22.

Power that is output from the power storage apparatus 21 is supplied to one or more electric loads 2 installed within the consumer's building 1 or around it, or to the power grid 30. Power generated by the power generation apparatus 22 is supplied to one or more electric loads 2 installed within the consumer's building 1 or around it, or to the power grid 30, or used for charging of the power storage apparatus 21. The supply destination of power by the power storage apparatus 21 and the photovoltaic power generation apparatus 22 is determined under various conditions described below.

The power storage apparatus 21 may be of an installed-type that is installed at a fixed position of the consumer's building 1 or a portable-type. Alternatively, a storage battery for travelling that is mounted in an electric vehicle (such as an electric car or a plug-in hybrid car) may be used as the power storage apparatus 21. The power converter of the power storage apparatus 21 converts DC power output from the storage battery into AC power equivalent to AC power that is received from the power grid 30. Instead of the storage battery, the power storage apparatus 21 may include a capacitor having a high-capacitance, or be configured to convert electric power into another form of energy and store it. The photovoltaic power generation apparatus 22 may be replaced with another power generation apparatus using energy such as wind, hydro or geothermal energy, as long as it has a configuration of converting natural energy into electric power.

It is assumed that the building 1 is a hospital, a hotel, a factory or the like. In addition, the below described technique can be applied even to a case where spaces for consumers exist in the building 1, such as a condominium, an office building or a commercial building, if the whole building's power is managed collectively. For example, a distribution board may be provided in each consumer's space, and further a principal distribution board for distributing power to the whole building may be provided in a building manager room, an electric room or the like. Also, in a building that is adapted for collectively receiving power at high voltage, an electricity meter for collectively receiving power at high voltage is provided as a measurement device. In this case therefore, it is possible to measure the total power received by the building. Furthermore, the below described technique can be applied even to detached houses as buildings 1 of consumers in a region, if the buildings 1 can be managed collectively as one aggregate and there is an electricity aggregator that collectively manages power of the respective power storage apparatuses 21 installed in the buildings 1.

When a consumer's building 1 is a hospital, a hotel, a factory, a condominium, an office building, a commercial building or the like, a power storage apparatus 21 therein has a capacitance of 100 kWh or more. Alternatively, a power storage apparatus 21 having a capacitance that exceeds 1000 kWh may be installed. Also, when detached houses exist in a region and share a single power storage apparatus 21, the single power storage apparatus 21 may have a large capacitance.

When buildings 1 of consumers in one aggregate share a single power storage apparatus 21, desirably, there exists a service provider that collectively manages the buildings 1 of the consumers such that an electric utility that supplies power to the buildings 1 of the consumers through the power grid 30 can regard the buildings 1 of the consumers in the aggregate collectively, as one building 1. This kind of service provider supplies various services to the buildings 1 of the consumers in the aggregate on behalf of the electric utility that performs a power generation business. As an example of this kind of service provider, a demand response service provider including an electricity aggregator is considered.

The electric utility may be an electricity utility selected from a general electricity utility (so-called power company), an independent power producer, a specified electricity utility, a power producer and supplier and the like. Alternatively, the electric utility may be a service provider that does not perform a power generation business, but does purchase power from another company and sell the purchased power to consumers.

Note that, when a consumer's building 1 is a detached house, a power storage apparatus 21 therein has a capacitance in a range of approximately 1 to 10 kWh. The below described technique can be applied even to such a small-scale power storage apparatus 21, as long as a power trade is allowed to be conducted.

(Embodiment 1)

In this embodiment, as shown in FIG. 1, a case will be described, where two or more electric loads 2 (two in FIG. 1) that consume power and a power storage apparatus 21 capable of supplying power to a power grid 30 are provided in a consumer's building 1. In other words, only the power grid 30 and the power storage apparatus 21 supply power to the electric loads 2 in the building 1. A distribution board 32 is installed in the consumer's building 1. The power grid 30, the power storage apparatus 21 and the electric loads 2 are connected to the distribution board 32.

The distribution board 32 includes: a principal circuit (not shown) that receives power from the power grid 30; and a plurality of branch circuits (not shown) that are branched from the principal circuit and constitute a plurality of systems. In other words, in the distribution board 32, an electric path is branched to form the branch circuits so as to supply power received from the power grid 30 to the electric loads 2 connected to the systems, and the distribution board 32 protects each branch circuit from an abnormal current.

A controller 16 controls: time periods during which charging and discharging of a storage battery (not shown) of the power storage apparatus 21 are performed; and the charging power and the discharging power. The storage battery of the power storage apparatus 21 is charged with power received from the power grid 30. The power storage apparatus 21 has a function to measure a residual capacity (power storage amount) of the storage battery of the power storage apparatus 21. The residual capacity of the storage battery does not need to be measured in real time, as long as at least a residual capacity at a start point of charging or discharging of the storage battery is measured. More preferably, a residual capacity at an end point of the charging or discharging is additionally measured.

The supply destination of power that is output from the power storage apparatus 21 is selected by the controller 16 switching a switch (not shown) that is provided in the distribution board 32. In other words, the switch is controlled by the controller 16 to select any one of a first state that is to supply power from the power storage apparatus 21 to the electric loads 2 and a second state that is to supply power from the power storage apparatus 21 to the power grid 30. When the controller 16 selects the first state, power of the power storage apparatus 21 is applied to at least part of power that is needed by the electric loads 2 in the building 1, and accordingly, power to be received from the power grid 30 is reduced. On the other hand, when the controller 16 selects the second state, a reverse flow of power to the power grid 30 is performed.

The distribution board 32 is provided with a measurement device 31 that measures respective amounts of power passing through the principal circuit and the plurality of branch circuits. The measurement device 31 is housed in a casing of the distribution board 32, or in another casing that is provided separately from the distribution board 32. A value of power passing through the principal circuit may be a value measured by an electricity meter that is installed at the building 1. Respective values of power passing through the plurality of branch circuits may be values measured by measurement units that are provided separately from the distribution board 32. Regarding power passing through the principal circuit, power from the power grid 30 and power reversely flowing to the power grid 30 are measured individually.

Desirably, the measurement device 31 is an electronic electricity meter that includes: current sensors (not shown), which respectively measure currents flowing through noted circuits; and a calculator (not shown) that calculates power with regard to noted circuits individually, based on a line voltage value of each noted circuit and a current value measured by each current sensor. The measurement device 31 of this embodiment does not necessarily measure power passing through the respective branch circuits individually, as long as it can measure at least a total amount of power consumed by the electric loads 2.

Incidentally, it is assumed in this embodiment that there is a power trade market. A power management system 10 determines a necessary condition for allowing a consumer to sell electric power in the power trade market. This necessary condition is determined based on an assumption that a period (hereinafter, referred to as an "interruption period") during which sides of consumers cannot receive power from the power grid 30, such as planned outage, is known. In addition, it is assumed that the power storage apparatus 21 supplies power to the electric loads 2 during the interruption period, and power to be sold when the contract is made in the power trade market is power stored in the power storage apparatus 21.

When the contract for a power trade is made, a timing for selling power is basically after the interruption period. In other words, power of the power storage apparatus 21 is supplied to the power grid 30 after the power grid 30 is restored. However, when a distribution network of the power grid 30 is independent in a relatively-narrow area such as the Community, namely, when the distribution network of the power grid 30 in this area can be separated upon the service interruption, it is possible to supply power from the power storage apparatus 21 to the power grid 30 even during the interruption period. Furthermore when the power trade is performed before start of the interruption period, it is also possible to supply power of the power storage apparatus 21 to the power grid 30 before the start of the interruption period.

The power management system 10 includes: a first administrator 11 that manages a residual capacity of the power storage apparatus 21; and a second administrator 12 that manages the interruption period. The first administrator 11 has a function to acquire information regarding the residual capacity of the storage battery measured in the power storage apparatus 21, and store a change in the residual capacity together with a date and time.

The second administrator 12 has a function to acquire and store information regarding a start date and time and an end date and time of the service interruption reported by an electric utility, such as planned outage. Accordingly, the second administrator 12 has a communication function to acquire interruption information that includes the interruption period from the electric utility, a service provider or the like. In addition to the interruption period, the interruption information may include: a region to which the service interruption is applied; a probability that the planned outage is implemented; and the like. Furthermore, in a region where the service interruption often occurs, the second administrator 12 may have a function to estimate a period during which the service interruption occurs, and store an estimated start date and time and an estimated end date and time.

The power management system 10 includes: a first estimator 13 that estimates an amount of power that is consumed by the electric loads 2 in the building 1 during the interruption period; and a second estimator 14 that estimates an estimation residual capacity that is a residual capacity of the power storage apparatus 21 at an end point of the interruption period. That is, the first estimator 13 estimates, as first power information, an amount of power that is consumed by the electric loads 2 during the interruption period that is managed by the second administrator 12. A timing at which the first estimator 13 estimates the first power information is before the interruption period (i.e., at a start point of the interruption period, or before the start point).

In order to estimate the first power information, the first estimator 13 uses: history information including a transition in power consumed by the electric loads 2 in the building 1, which is stored together with a condition that has an influence on the consumption of power; and a value of power that has been consumed at a time point when the first power information is estimated. That is, the first estimator 13 stores data sets of the history information, and extracts a data set of history information that corresponds to a condition of the interruption period, and estimates an amount of power which will be consumed during the interruption period, based on the extracted data set of history information. In this case, the condition that has an influence on the consumption of power includes at least the date and time (season and time slot), and more preferably, further includes the weekday or the holiday, the weather condition (such as weather and air temperature) and the like.

The second estimator 14 estimates the estimation residual capacity that is the residual capacity of the power storage apparatus 21 at the end point of the interruption period, based on information regarding the residual capacity of the power storage apparatus 21 managed by the first administrator 11 and the first power information (the amount of power which will be consumed during the interruption period) estimated by the first estimator 13. A timing at which the second estimator 14 estimates the estimation residual capacity of the power storage apparatus 21 is not limited in particular, as long as it is before the power trade. However, preferably the timing is before the start point of the interruption period.

Incidentally, when power remains in the power storage apparatus 21 at the end point of the interruption period, it is possible to reduce an amount of power to be received from the power grid 30 by supplying power from the power storage apparatus 21 to the electric loads 2. However, it is impossible to recover cost spent for introduction of the power storage apparatus 21. In order to resolve the issue, when power remaining in the power storage apparatus 21 at the end point of the interruption period can be sold, the system in this embodiment is configured such that it is possible to participate in the power trade market, using this power as an object of a power trade.

A determiner 15 provided in the power management system 10 determines whether or not to participate in the power trade market. The determiner 15 determines whether or not to participate in the power trade market, based on the residual capacity of the power storage apparatus 21 at the end point of the interruption period. That is, the determiner 15 determines that a condition for participating in the power trade market is met, when the residual capacity (estimation residual capacity) of the power storage apparatus 21 at the end point of the interruption period estimated by the second estimator 14 exceeds a reference value. In other words, the determiner 15 communicates with a trading device 40 described later through a telecommunication network NT to offer a trade of power to the power trade market. When it is determined that the condition for participating in the power trade market is met, an upper limit of an amount of power for the power trade (a power selling amount) is set to an amount of power, by which the residual capacity (estimation residual capacity) of the power storage apparatus 21 at the end point of the interruption period exceeds the reference value. The reference value is set in consideration that an error occurs in an estimation result of the second estimator 14 due to an estimation error of the first estimator 13. Therefore, the residual capacity (estimation residual capacity) of the power storage apparatus 21 at the end point of the interruption period has a margin corresponding to the reference value.

On the other hand, the determiner 15 determines that it is impossible to participate in the power trade market, when the residual capacity (estimation residual capacity) at the end point of the interruption period is equal to or less than the reference value. When the residual capacity (estimation residual capacity) of the power storage apparatus 21 at the end point of the interruption period is equal to the reference value, it is possible to supply power to the electric loads 2 during the interruption period. However, when the residual capacity (estimation residual capacity) of the power storage apparatus 21 at the end point of the interruption period is less than the reference value, there may be a shortage of power during the interruption period.

Accordingly, when the residual capacity (estimation residual capacity) of the power storage apparatus 21 at the end point of the interruption period is less than the reference value, the determiner 15 preferably prohibits supplying of power from the power storage apparatuses 21 to the electric loads 2 during the interruption period, or limits kinds or operations of the electric loads 2 to which power is supplied from the power storage apparatuses 21. An electric load(s) 2 to which power is allowed to be supplied from the power storage apparatuses 21 during the interruption period may be previously determined in accordance with importance levels, priority levels or the like, of the electric loads 2. In this case, the first estimator 13 preferably estimates an amount of power to be consumed by the electric loads 2, in assuming that kinds or operations of the electric loads 2 to which power is supplied from the power storage apparatuses 21 during the interruption period are limited. Also in the case where kinds or operations of the electric loads 2 are limited, the degree of limitation may be set by two or more steps in accordance with the importance levels, the priority levels or the like, of the electric loads 2.

When a power seller or buyer has participated in the power trade market and further made the contract for the power trade, the determiner 15 instructs the controller 16 to select the second state (i.e., the state where power is supplied from the power storage apparatuses 21 to the power grid 30). Thus, the determiner 15 instructs the controller 16 to select the second state after participating in the power trade market and making the contract for the power trade through communication with the trading device 40, thereby supplying power of the power storage apparatuses 21 to the power grid 30.

Even when the power management system 10 transmits a request for participating in the power trade market to the trading device 40, there is also a case where the power trade is not made, such as a case where trade terms of a power seller and a power buyer do not match with each other, or a case where a trade term of another power seller is more advantageous to the power buyer than that of the power seller. When the power trade is not made, the determiner 15 instructs the controller 16 to supply power of the power storage apparatuses 21 to the electric loads 2 as needed, without supplying of power from the power storage apparatuses 21 to the power grid 30. In other words, the determiner 15 instructs the controller 16 to select the second state when the power trade is made, and the first state when the power trade is not made.

Hereinafter, the power trade will be described simply. The power trade is established when a power buyer and a power seller that can meet a demand of the power buyer exist. The power trade is performed by the power buyer and seller respectively presenting and advertising the trade terms. A device that manages the power trade market is the trading device 40, and the power trade is performed by terminal devices of the power buyer and seller respectively presenting the trade terms to the trading device 40 via the telecommunication network NT such as the Internet.

The trading device 40 searches for an equilibrium point of a demand and a supply from the trade term presented by the power buyer and the trade term presented by the power seller, and when having obtained the equilibrium point, establishes a power trade (makes a contract), and on the other hand when not having obtained the equilibrium point, establishes no power trade. The trade term mentioned here includes: an implementation period during which supplying and receiving of power are implemented; power (or an amount of power) in the implementation period; and a price of power (a unit price or a total price). The trading device 40 reports the result regarding the power trade to the terminal devices of the power buyer and seller, and when the contract for the power trade is made, also reports the trade term under which the contract is made to the terminal devices. In this embodiment, the power management system 10 corresponds to the terminal devices.

In this case, as an example of the power trade, it is assumed that each of the power buyer and seller presents the trade term having two or more steps. Regarding the implementation period included in the trade term, if the trade term presented by the power buyer overlaps with at least a part of the trade term presented by the power seller, the power trade can be performed. That is, if the implementation period demanded by the power buyer overlaps with the implementation period provided by the power seller, the power trade can be performed. Regarding the power and the price of the power of the trade term, each of the power buyer and seller presents two or more kinds of combinations. The trading device 40 sets, to the equilibrium point, a point at which the price of the trade term of the power seller agrees with that of the power buyer.

Generally, the power buyer sets a combination of the power and the price such that more power is obtained, as the price is lower, and the power seller sets a combination of the power and the price such that more power is sold, as the price is higher. Accordingly, if there is a region where a range of the price set by the power buyer partially overlaps with that set by the power seller, the trading device 40 can obtain the equilibrium point.

Figures 2, 3A, 3B:
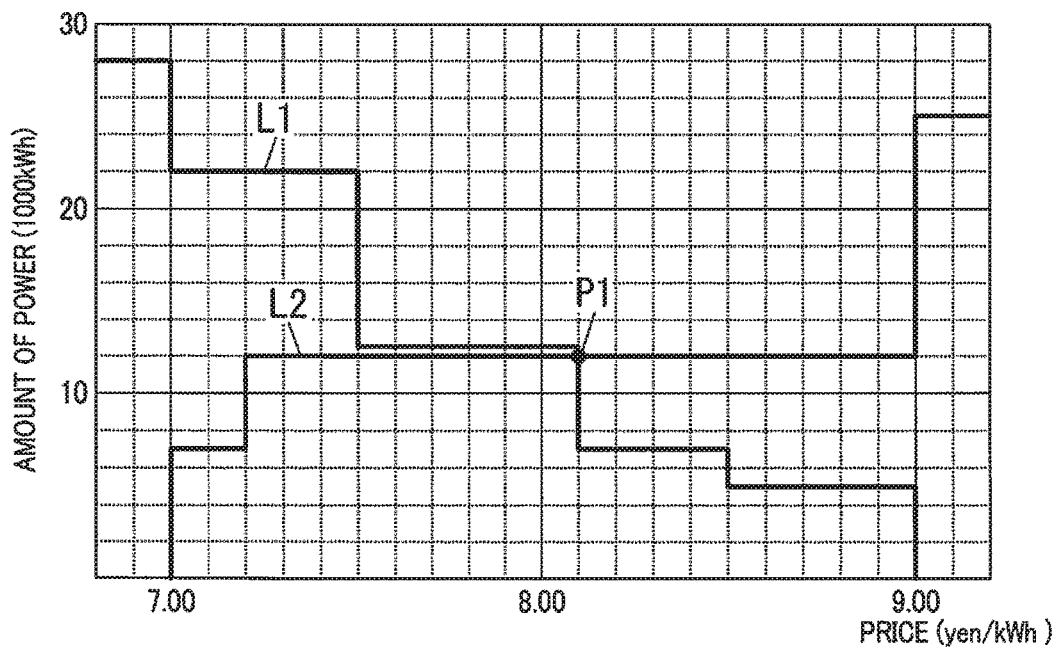
FIG. 2 is a diagram illustrating a setting example of a price for a power trade according to Embodiment 1.
FIGS. 3A and 3B are diagrams illustrating examples of a power trade according to Embodiment 1.

One example of the power trade by the trading device 40 is shown in FIG. 2. The figure shows an example where the power trade is performed, using a combination of an amount of power and a power unit price per kWh. In FIG. 2, a case is assumed where regarding the power buyer, an amount of power capable of being purchased per hour and the unit price have a relationship shown in FIG. 3A, and regarding the power seller, an amount of power capable of being sold per hour and the unit price have a relationship shown in FIG. 3B.

In the examples of FIGS. 3A and 3B, when the unit price is equal to or less than 7.00 yen, the power buyer is capable of purchasing an amount of power of 28,000 kWh, and when the unit price is more than 8.50 yen and equal to or less than 9.00 yen, the power buyer is capable of purchasing an amount of power of 5,000 kWh. When the unit price is more than 9.00 yen, the power buyer abandons the purchase of power. On the other hand, when the unit price is more than 7.00 yen and equal to or less than 7.20 yen, the power seller is capable of selling an amount of power of 7,000 kWh as an upper limit, and when the unit price is more than 9.00 yen, the power seller is capable of selling an amount of power of 25,000 kWh as an upper limit When the unit price is equal to or less than 7.00 yen, the power seller abandons the selling of power.

Hereinafter, regarding graphs of FIG. 2 each representing the relationship between the amount of power and the unit price, a graph representing the relationship of the power buyer is referred to as a demand line L1, and a graph representing the relationship of the power seller is referred to as a supply line L2. According to the graphs, a point (equilibrium point) at which the amount of power demanded by the power buyer agrees with the amount of power for the trade, which the power seller is capable of supplying, is represented by an intersection point P1 of the demand line L1 and the supply line L2. In other words, in the relationships shown in FIG. 2, the contracted amount of power is 12,000 kWh per hour, and the unit price in this case is 8.10 yen per kWh.

As above, when the equilibrium point between the power seller and buyer is obtained, the trading device 40 reports the made contract together with the established trade term to the power seller and buyer. Here when the contracted amount of power is insufficient for the power buyer, a power shortage is supplied separately. In the above example, the contracted amount of power is 12,000 kWh per hour, and when the power buyer needs 13,000 kWh per hour, a power shortage of 1000 kWh is generated and accordingly, this shortage is supplied separately.

The above-mentioned trade is one example, and because it is assumed that more participants actually exist, the number of combinations for making the contract may become huge. For this reason, it is preferable that an appropriate combination be extracted by an algorithm capable of obtaining a relatively good solution in a finite time period, such as a probabilistic algorithm or a genetic algorithm Also in the above-mentioned example, the demand line L1 and the supply line L2 are denoted by discontinuous lines in combination of straight lines, but may be denoted by smoothly continuous curved lines. The relationship between the demand line L1 and the supply line L2 is variously set in accordance with environment conditions of the power buyer and seller. The environment condition mentioned here means a financial resource, an urgency level of a power demand or the like, of the power buyer or the power seller.

In the above configuration example of the power management system 10, the following elements can be installed in the building 1: the first administrator 11, the second administrator 12, the first estimator 13, the second estimator 14, the determiner 15 and the controller 16. However, the elements other than the controller 16 may be installed separately from the building 1. When the elements other than the controller 16 are installed separately from the building 1, the power management system 10 may be realized using a web-server or a cloud computing system.

In this case, it is preferable that a communication interface be provided in the building 1 in order to transfer a residual capacity of the storage battery measured by the power storage apparatus 21 to the first administrator 11, and transfer a value of power measured by the measurement device 31 to the first estimator 13. Also it is preferable that a communication interface be provided in the building 1 such that the determiner 15 reports to the controller 16 whether or not the contract is made.

In other words, with the communication interface being provided in the building 1, the building 1 can receive the service provided by the trading device 40 without installing the first administrator 11, the second administrator 12, the first estimator 13, the second estimator 14 and the determiner 15 in the building 1.

Note that, in the above-mentioned embodiment, a configuration that the power storage apparatus 21 is installed in the building 1 is assumed. However, the storage battery of the power storage apparatus 21 may be a storage battery mounted in an electric vehicle. The supply destination of power from the power storage apparatus 21 may be finally determined to be the electric loads 2 or the power grid 30 in consideration of another condition.

When the power storage apparatus 21 can be charged before the start point of the interruption period, the residual capacity estimated by the second estimator 14 may be corrected with an amount of power with which it can be charged before the start point of the interruption period, and the determiner 15 may use information regarding the corrected residual capacity.

(Embodiment 2)

In this embodiment, as shown in FIG. 4, a case will be described, where a photovoltaic power generation apparatus 22 is installed in a building 1 in addition to a power storage apparatus 21. The photovoltaic power generation apparatus 22 does not need a consideration of charging, unlike the power storage apparatus 21, however, power generated by it is not constant. That is, power that can be output changes every moment, depending on a temperature, and intensity, an incident angle, a wavelength component and the like, of light that is incident on a solar cell constituting the photovoltaic power generation apparatus 22. Also, the photovoltaic power generation apparatus 22 is not configured to output a fixed voltage, but configured such that an output voltage thereof follows a line voltage of electric lines connected to the photovoltaic power generation apparatus 22. In other words, when the generated power is changed while power is received from the power grid 30, the output voltage of the photovoltaic power generation apparatus 22 is kept at the voltage of the power grid 30, and a current is changed so as to follow the change in the power.

Power to be generated by the photovoltaic power generation apparatus 22 is estimated based on the weather, air temperature and the like. A power management system 10 of this embodiment includes a third estimator 17 that estimates power to be generated by the photovoltaic power generation apparatus 22. The power management system 10 further includes a third administrator 18 that manages power generated by the photovoltaic power generation apparatus 22. The third administrator 18 has a function that acquires information regarding power generated by the photovoltaic power generation apparatus 22 from a sensor (not shown) (that monitors a current and a voltage, similarly to a measurement device 31), and stores a transition in power of the acquired information together with a date and time. Because the information stored in the third administrator 18 is used for estimating an amount of power to be generated by the photovoltaic power generation apparatus 22, it is preferable that the third administrator 18 also store another condition of contributing to the amount of power to be generated by the photovoltaic power generation apparatus 22, in addition to the date and time. This type of condition includes an amount of solar radiation, air temperature, the season and the like.

The third estimator 17 estimates an amount of power, which will be generated by the photovoltaic power generation apparatus 22 during an interruption period, based on the past change (history) in power stored in the third administrator 18, information regarding a weather report (in particular, weather and air temperature), and the like. The information regarding the amount of power estimated by the third estimator 17 is used by the second estimator 14 for estimating a residual capacity of the power storage apparatus 21. In this case the second estimator 14 estimates, as an estimation residual capacity, a residual capacity of the power storage apparatus 21 at an end point of the interruption period additionally based on a condition of supplying, to the electric loads 2, power generated by the photovoltaic power generation apparatus 22 prior to power output from the power storage apparatus 21 during the interruption period.

In other words, the following condition is set: if possible, the power generated by the photovoltaic power generation apparatus 22 is supplied to the electric loads 2 during the interruption period, and when an amount of power generated by the photovoltaic power generation apparatus 22 is insufficient for an amount of power needed by the electric loads 2, the power storage apparatus 21 supplies power to the electric loads 2. Under this condition, the second estimator 14 estimates the residual capacity (estimation residual capacity) of the power storage apparatus 21 at the end point of the interruption period. With this configuration, the residual capacity (estimation residual capacity) of the power storage apparatus 21 at the end point of the interruption period becomes more than that of Embodiment 1 with a high possibility.

Therefore, compared with the configuration described in Embodiment 1, an opportunity to participate in a power trade market is more increased, and an amount of power that can be provided for a power trade is also more increased. In other words, a price obtained by the power trade is increased, and accordingly, it is possible to shorten a recovery period of cost spent for introduction of the power storage apparatus 21 and the photovoltaic power generation apparatus 22. When during the interruption period an amount of power generated by the photovoltaic power generation apparatus 22 is more than an amount of power needed by the electric loads 2 and further the power storage apparatus 21 is not in a fully charged state, a surplus of the amount of power generated by the photovoltaic power generation apparatus 22 can be used for charging the power storage apparatus 21. In this case, the residual capacity of the power storage apparatus 21 at the end point of the interruption period is further increased.

The other constituents and operations of this embodiment are similar to those of Embodiment 1. In this embodiment, since not only the power storage apparatus 21 but also the photovoltaic power generation apparatus 22 are used as the power storage apparatus 21, available power is increased, and accordingly, the residual capacity of the power storage apparatus 21 at the end point of the interruption period can be expected to be increased. In other words, an opportunity that participation in the power trade market is allowed is increased. In addition, because the photovoltaic power generation apparatus 22 generates power using natural energy, a cost of power generation does not occur, and accordingly, it is possible to expect an increase in the profit when the contract for the power trade is made. Note that, as described above, the photovoltaic power generation apparatus 22 in this embodiment may be replaced with another power generation apparatus that generates power using natural energy such as wind, hydro or geothermal energy.

Although the present invention has been described with reference to certain preferred embodiments, numerous modifications and variations can be made by those skilled in the art without departing from the true spirit and scope of this invention, namely claims.

The invention claimed is:

1. A power management system, comprising:
 a first administrator configured to manage a residual capacity of a power storage apparatus;
 a second administrator configured to manage interruption information that includes an interruption period during which a power grid is in a service interruption state;
 a first estimator configured to estimate, as first power information, an amount of power that is consumed by an electric load during the interruption period;
 a second estimator configured to estimate, at a start point of the interruption period or before start of the interruption period, an estimation residual capacity based on the first power information,
 the estimation residual capacity being the residual capacity of the power storage apparatus at an end point of the interruption period; and
 a determiner configured to determine that a condition for participating in a power trade market is met, when the estimation residual capacity exceeds a reference value, and to set an amount of power by which the estimation residual capacity exceeds the reference value, as an upper limit of a power selling amount in the power trade market.

2. The power management system according to claim 1, wherein
 the determiner is configured to determine that it is impossible to participate in the power trade market, when the estimation residual capacity is equal to or less than the reference value.

3. The power management system according to claim 2, further comprising a third estimator,
 the third estimator being configured to estimate, as second power information, an amount of power to be generated during the interruption period by a power generation apparatus,
 the power generation apparatus being configured to generate power using natural energy and supply the power to the electric load prior to output from the power storage apparatus,
 wherein the second estimator is configured to estimate, at the start point of the interruption period or before the start of the interruption period, the estimation residual capacity based on the second power information in addition to the first power information.

4. The power management system according to claim 2, further comprising a controller,
 the controller being configured to select any one of: a first state of supplying power from the power storage apparatus to the electric load; and a second state of supplying power from the power storage apparatus to the power grid,
 wherein the determiner is configured to instruct the controller to select the second state, when a contract for a power trade is made.

5. The power management system according to claim 1, further comprising a third estimator, the third estimator being configured to estimate, as second power information, an amount of power to be generated during the interruption period by a power generation apparatus, the power generation apparatus being configured to generate power using natural energy and supply the power to the electric load power prior to output from the power storage apparatus,
 wherein the second estimator is configured to estimate, at the start point of the interruption period or before the start of the interruption period, the estimation residual capacity based on the second power information in addition to the first power information.

6. The power management system according to claim 5, further comprising a controller, the controller being configured to select any one of: a first state of supplying power from the power storage apparatus to the electric load; and a second state of supplying power from the power storage apparatus to the power grid, wherein the determiner is configured to instruct the controller to select the second state, when a contract for a power trade is made.

7. The power management system according to claim 1, further comprising a controller, the controller being configured to select any one of: a first state of supplying power from the power storage apparatus to the electric load; and a second state of supplying power from the power storage apparatus to the power grid, wherein the determiner is configured to instruct the controller to select the second state, when a contract for a power trade is made.

8. A non-transitory computer-readable recording medium recording a computer program, which when executed by a computer or a processor, causes the computer or the processor to function as the power management system according to claim 1.

9. A power management method, comprising:

managing, with a first administrator, a residual capacity of a power storage apparatus;

managing, with a second administrator, interruption information that includes an interruption period during which a power grid is in a service interruption state;

estimating, with a first estimator, as first power information, an amount of power that is consumed by an electric load during the interruption period;

estimating, with a second estimator, at a start point of the interruption period or before start of the interruption period, an estimation residual capacity based on the first power information, the estimation residual capacity being the residual capacity of the power storage apparatus at an end point of the interruption period;

determining, with a determiner, that a condition for participating in a power trade market is met, when the estimation residual capacity exceeds a reference value; and setting, with the determiner, an amount of power by which the estimation residual capacity exceeds the reference value, as an upper limit of a power selling amount in the power trade market.

10. A power management system, comprising:

at least one processor programmed to:

manage a residual capacity of a power storage apparatus;

manage interruption information that includes an interruption period during which a power grid is in a service interruption state;

estimate, as first power information, an amount of power that is consumed by an electric load during the interruption period;

estimate, at a start point of the interruption period or before start of the interruption period, an estimation residual capacity based on the first power information, the estimation residual capacity being the residual capacity of the power storage apparatus at an end point of the interruption period; and determine that a condition for participating in a power trade market is met, when the estimation residual capacity exceeds a reference value, and set an amount of power by which the estimation residual capacity exceeds the reference value, as an upper limit of a power selling amount in the power trade market.

11. The power management system according to claim 10, wherein the at least one processor is further programmed to determine that it is impossible to participate in the power trade market, when the estimation residual capacity is equal to or less than the reference value.

12. The power management system according to claim 10, wherein the at least one processor is further programmed to:

estimate, as second power information, an amount of power to be generated during the interruption period by a power generation apparatus, the power generation apparatus generating power using natural energy and supplying the power to the electric load prior to output from the power storage apparatus, and estimate, at the start point of the interruption period or before the start of the interruption period, the estimation residual capacity based on the second power information in addition to the first power information.

13. The power management system according to claim 10, wherein the at least one processor is further programmed to:

select any one of a first state of supplying power from the power storage apparatus to the electric load, and a second state of supplying power from the power storage apparatus to the power grid; and select the second state, when a contract for a power trade is made.

* * * * *